(12) United States Patent
Wang

(10) Patent No.: US 7,480,424 B2
(45) Date of Patent: Jan. 20, 2009

(54) METHOD AND APPARATUS FOR MODIFYING AN ELECTROMAGNETIC RADIATION BEAM

(75) Inventor: Shih-Yuan Wang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/230,159

(22) Filed: Sep. 19, 2005

(65) Prior Publication Data

US 2007/0065068 A1 Mar. 22, 2007

(51) Int. Cl.
*G02F 1/035* (2006.01)
*G02B 6/32* (2006.01)

(52) U.S. Cl. .............................. 385/2; 385/33
(58) Field of Classification Search ...................... 385/2, 385/6, 33; 359/319
See application file for complete search history.

(56) References Cited

U.S. PATENT DOCUMENTS

| 6,822,784 | B2* | 11/2004 | Fukshima et al. ............ 359/298 |
| 6,865,009 | B2* | 3/2005 | Nishioka ..................... 359/295 |
| 6,870,517 | B1 | 3/2005 | Anderson |
| 6,931,191 | B2* | 8/2005 | Kitagawa et al. ............. 385/129 |
| 6,975,664 | B1 | 12/2005 | Dodabalapur et al. |
| 7,064,886 | B2* | 6/2006 | Moon et al. .................. 359/321 |
| 2003/0042487 | A1 | 3/2003 | Sarychev et al. |
| 2003/0223721 | A1 | 12/2003 | Povinelli et al. |
| 2003/0227415 | A1 | 12/2003 | Joannopoulos et al. |
| 2004/0091010 | A1 | 5/2004 | Choquette et al. |
| 2004/0135155 | A1 | 7/2004 | Otsuka et al. |
| 2005/0008308 | A1 | 1/2005 | Bita et al. |
| 2006/0050412 | A1* | 3/2006 | Ito et al. ...................... 359/745 |
| 2006/0171032 | A1 | 8/2006 | Nishioka |

OTHER PUBLICATIONS

Berrier, A., et al., Negative Refraction at Infrared Wavelengths in a Two-Dimensional Photonic Crystal, Physical Review Letters, vol. 93, No. 7, 4 pages, Aug. 13, 2004.
Cowan, B., et al., Photonic Crystal Laser Accelerator Structures, Proceedings of the 2003 Particle Accelerator Conference, pp. 1855-1857, © 2003 IEEE.
Fang, Nicholas, et al., Reports, Sub-Diffraction-Limited Optical Imaging with a Silver Superlens, Science, vol. 308, pp. 534-537, Apr. 22, 2005.
Gersen, H., et al., Direct Observation of Bloch Harmonics and Negative Phase Velocity in Photonic Crystal Waveguides, Physical Review Letters, vol. 94, No. 12, Apr. 1, 2005.

(Continued)

*Primary Examiner*—Charlie Peng

(57) ABSTRACT

Devices and methods for modifying an electromagnetic beam include a tunable refractive medium, an input waveguide configured for directing an incident radiation to the tunable refractive medium, and at least one output waveguide configured for directing a focused radiation emanating from the tunable refractive medium. The tunable refractive medium comprises first electrodes coupled to a first surface of a periodic dielectric medium, and second electrodes coupled to a second surface of the periodic dielectric medium. The periodic dielectric medium includes a dielectric periodicity configured for providing a negative refraction of the incident radiation and focusing the focused radiation at a focal location. The focal location may be modified by at least one electromagnetic signal applied between the first electrodes and the second electrodes.

28 Claims, 6 Drawing Sheets

OTHER PUBLICATIONS

Inoue, K., et al., Photonic Crystals, Physics, Fabrication and Applications, Springer-Verlag Berlin Heidelberg 2004.

Jamois, C., et al., Silicon-based two-dimensional photonic crystal waveguides, Photonics and Nanostructures—Fundamentals and Applications 1, pp. 1-13, 2003.

Joannopoulos, John D., et al., Photonic Crystals, Molding the Flow of Light, Princeton University Press 1995.

Kramper, Patrick, et al., Near-field visualization of light confinement in a photonic crystal microresonator, Optics Letters, vol. 29, No. 2, pp. 174-176, Jan. 15, 2004.

Kramper, P., et al., Highly Directional Emission from Photonic Crystal Waveguides of Subwavelength Width, Physical Review Letters, vol. 92, No. 11, 4 pages, Mar. 19, 2004.

Lagarkov, A.N., et al., Near-Perfect Imaging in a Focusing System Based on a Left-Handed-Material Plate, Physical Review Letters, vol. 92, No. 7, 4 pages, Feb. 20, 2004.

Lee, Y.H., et al., Low Threshold 2-D Photonic Crystal Lasers, TuK2, 0-7803-7500-9/02, pp. 219-220, © 2002 IEEE.

Linden, Stefan, et al., Magnetic Response of Metamaterials at 100 Terahertz, Science, vol. 306, pp. 1351-1353, Nov. 19, 2004.

Liu, Liu, et al., Near-field optical storage system using a solid immersion lens with a left-handed material slab, Optics Express 4836, vol. 12, No. 20, 6 pages, Oct. 4, 2004.

Parazzoli, C.G., et al., Experimental Verification and Simulation of Negative Index of Refraction Using Snell's Law, Physical Review Letters, vol. 90, No. 10., 4 pages, Mar. 14, 2003.

Pendry, J.B., Negative Refraction Makes a Perfect Lens, Physical Review Letters, vol. 85, No. 18, pp. 3966-3969, Oct. 30, 2000.

Pendry, John B., et al., Reversing Light: Negative Refraction, Physics Today, 8 pages, Dec. 2003.

Prasad, Tushar, et al., Superprism phenomenon in three-dimensional macroporous polymer photonic crystals, Physical Review B 67, 7 pages, 2003.

Qiu, Min, et al., Wave Propagation Through a Photonic Crystal in a Negative Phase Refractive-Index Region, IEEE Journal of Selected Topics in Quantum Electronics, vol. 9, No. 1, pp. 106-110, Jan./Feb. 2003.

Ramakrishna, S. Anantha, et al., Removal of absorption and increase in resolution in a near-field lens via optical gain, Physical Review B 67, 4 pages, 2003.

Ripoll, Jorge, et al., Optimal tuning of lasing modes through collective particle resonance, J. Opt. Soc. Am. B, vol. 21, No. 1, pp. 141-149, Jan. 2004.

Schonbrun, Ethan, et al., Negative Refraction in a Si-Polymer Photonic Crystal Membrane, IEEE Photonics Technology Letters, 3 pages, © 2005 IEEE.

Smith, David R., et al., Design and Measurement of Anisotropic Metamaterials that Exhibit Negative Refraction IEICE Trans. Electron., vol. E87-C, No. 3, pp. 359-370, Mar. 2004.

Smith, David R., et al., Partial focusing of radiation by a slab of indefinite media, Applied Physics Letters, vol. 84. No. 13, pp. 2244-2246, Mar. 29, 2004.

Smith, D.R., et al., Metamaterials and Negative Refractive Index, Science, vol. 305, pp. 788-792, Aug. 6, 2004.

Srituravanich, Werayut, et al., Plasmonic Nanolithography, Nano Letters, vol. 4, No. 6, pp. 1085-1088, 2004.

Srituravanich, W., et al., Sub-100 nm lithography using ultrashort wavelength of surface plasmons, J. Vac. Sci. Technol. B 22(6), pp. 3475-3478, Nov./Dec. 2004.

Wang, X., et al., Unrestricted superlensing in a triangular two-dimensional photonic crystal, Optics Express 2919, vol. 12, No. 13, 6 pages, Jun. 28, 2004.

Notomi, M., "Theory of high propagation in strongly modulated photonic crystals: Refractionlike behavior in the vicinity of the photonic band gap," Physical Reviews B, vol. 62, 10696-705 (2000).

Yokouchi et al., "Two-Dimensional Photonic Crystal Confined Vertical-Cavity Surface-Emitting Lasers," IEEE Journal of Selected Topics in Quantum Electronics, vol. 9, No. 5 (Sep. 2003).

Zhang, X., "Active Lens Realized by Two-Dimensional Photonic Crystal," Physics Letters A, vol. 337, No. 4-6 (Apr. 11, 2005) pp. 457-462.

\* cited by examiner

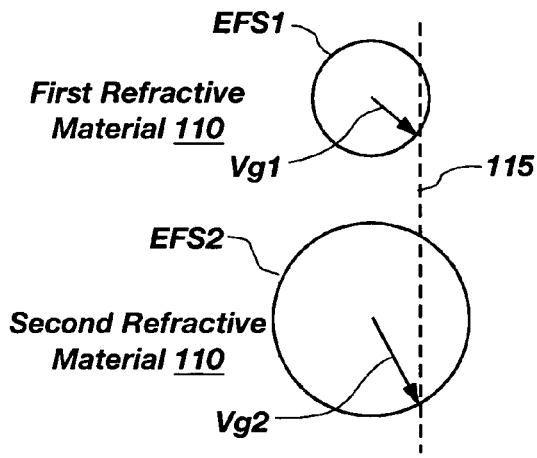
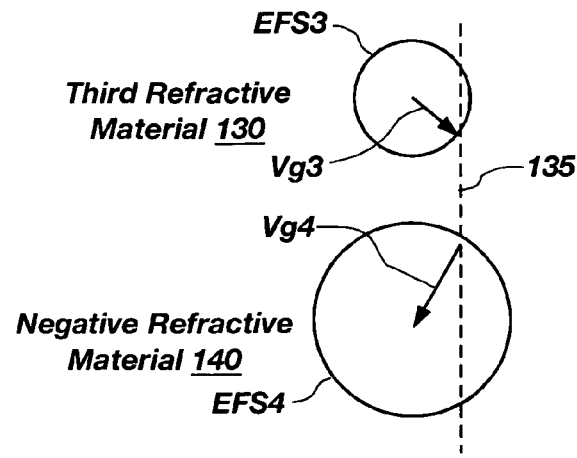
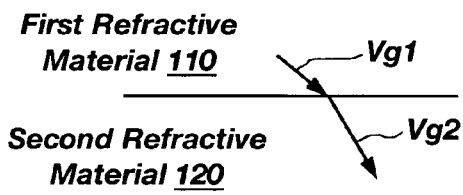
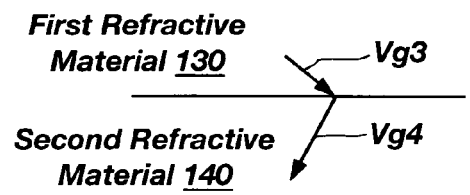
FIG. 1A
FIG. 1B
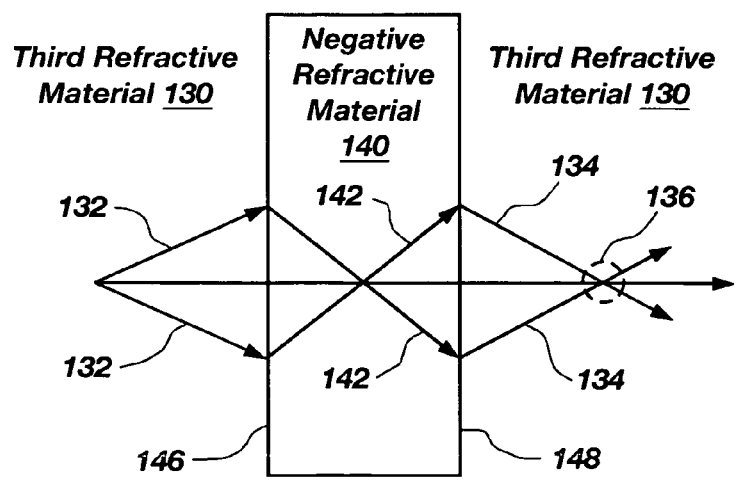
FIG. 2

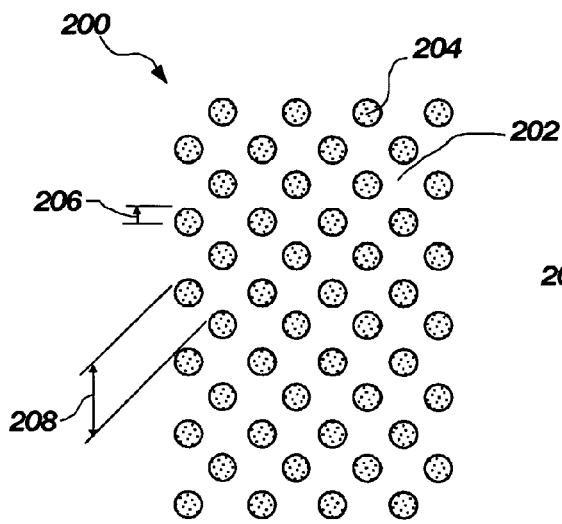
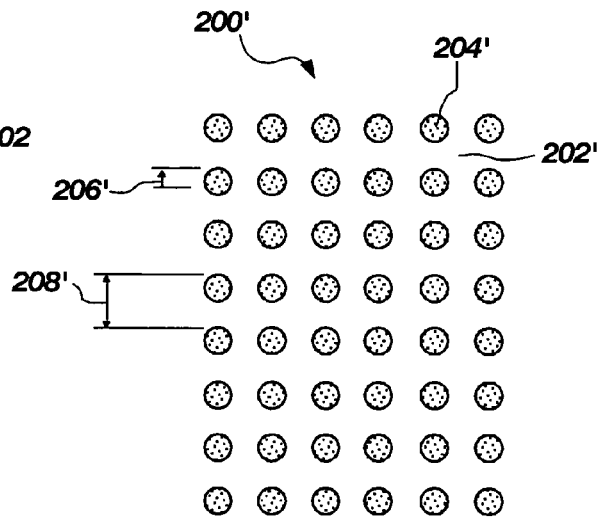
FIG. 3A  FIG. 3B
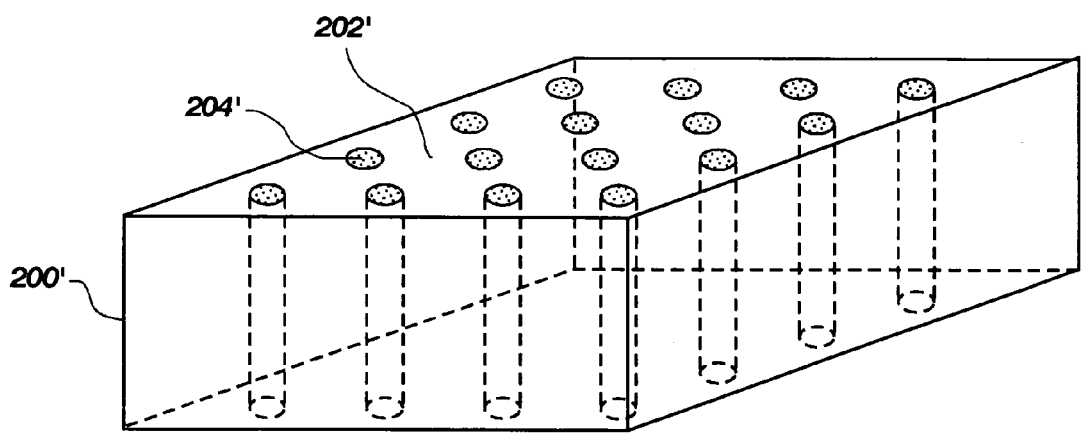
FIG. 4

METHOD AND APPARATUS FOR MODIFYING AN ELECTROMAGNETIC RADIATION BEAM

FIELD OF THE INVENTION

The present invention relates generally to modifying an electromagnetic radiation beam and more particularly to devices with a negative refractive index and methods of focusing electromagnetic radiation beams using negative refraction.

BACKGROUND OF THE INVENTION

Photonic crystals are a class of man-made materials, which are often referred to as "meta-materials." Photonic crystals are formed by dispersing a material of one dielectric constant periodically within a matrix having a different dielectric constant. A one-dimensional photonic crystal is a three-dimensional structure that exhibits periodicity in dielectric constant in only one dimension. Bragg mirrors are an example of a one-dimensional photonic crystal. The alternating thin layers have different dielectric constants and refractive indices. The combination of several thin layers forms a three-dimensional structure that exhibits periodicity in dielectric constant in only the direction orthogonal to the planes of the thin layers. No periodicity is exhibited in either of the two dimensions contained within the plane of the layers.

A two-dimensional (2D) photonic crystal can be formed by periodically dispersing rods or columns of a material of one dielectric constant within a matrix having a different dielectric constant. 2D photonic crystals exhibit periodicity in two dimensions (i.e., the directions perpendicular to the length of the rods or columns) but no periodicity is exhibited in the direction parallel to the length of the columns.

Finally, a three-dimensional photonic crystal can be formed by periodically dispersing small spheres or other spatially confined areas of a first material having a first dielectric constant within a matrix of a second material having a second, different, dielectric constant. Three-dimensional photonic crystals exhibit periodicity in dielectric constant in all three dimensions within the crystal.

Photonic crystals may exhibit a photonic bandgap over a range of frequencies in directions exhibiting periodicity in dielectric constant. In other words, there may be a range of frequencies of electromagnetic radiation that will not be transmitted through the photonic crystal in the directions exhibiting dielectric periodicity. This range of frequencies that are not transmitted is known as a photonic bandgap of the photonic crystal.

For an introduction to photonic crystals and their uses and applications, the reader is referred to John D. Joannopoulos, Robert D. Meade & Joshua N. Winn, *Photonic Crystals—Molding the Flow of Light*, (Princeton University Press 1995) and K. Inoue & K. Ithaca, *Photonic Crystals—Physics, Fabrication and Applications*, (Springer 2004)

In natural materials, electromagnetic radiation is refracted at a specific angle and in a specific direction when it encounters a junction between two materials. A class of meta-materials has been studied that refract electromagnetic radiation in the opposite direction from the direction of natural materials. These materials exhibiting negative refraction are often called super-lenses for their ability to refract in a negative direction and, as a result, refocus the electromagnetic radiation, rather than causing the electromagnetic radiation to disperse. Recently, it has been shown that photonic crystals may exhibit this negative refractive index. Many new and useful applications may be possible for these super-lens structures, particularly photonic crystals exhibiting negative refraction.

BRIEF SUMMARY OF THE INVENTION

A photonic crystal exhibiting negative lens properties, wherein the location of the focal point may be dynamically controlled, may be valuable in a wide variety of electronic applications.

The present invention, in a number of embodiments, includes a tunable refractive medium and methods of modifying an electromagnetic radiation beam. One embodiment of the present invention includes a tunable refractive medium comprising a periodic dielectric medium, at least one first electrode operably coupled to a first surface of the periodic dielectric medium, and at least one second electrode operably coupled to a second surface of the periodic dielectric medium. The periodic dielectric medium comprises an incident surface configured for receiving an incident radiation having an incident wavelength, an emitting surface configured for emitting a focused radiation at a wavelength substantially near the incident wavelength, and a periodic structure. The periodic structure includes a dielectric periodicity between the incident surface and the emitting surface, wherein the periodic structure is configured for providing a negative refraction of the incident radiation and focusing the focused radiation at a focal location outside the periodic dielectric medium. In addition, the at least one first electrode and the at least one second electrode are configured for carrying at least one electromagnetic signal developed to modify the focal location.

Another embodiment of the present invention includes an electromagnetic radiation tuning device, which comprises a tunable refractive medium, an input waveguide configured for directing an incident radiation to an incident surface of the tunable refractive medium, and at least one output waveguide configured for directing a focused radiation emanating from the tunable refractive medium. The tunable refractive medium comprises a periodic dielectric medium, at least one first electrode operably coupled to a first surface of the periodic dielectric medium, and at least one second electrode operably coupled to a second surface of the periodic dielectric medium. The periodic dielectric medium comprises the incident surface configured for receiving the incident radiation having an incident wavelength, an emitting surface configured for emitting the focused radiation at a wavelength substantially near the incident wavelength, and a periodic structure. The periodic structure includes a dielectric periodicity between the incident surface and the emitting surface, wherein the periodic structure is configured for providing a negative refraction of the incident radiation and focusing the focused radiation at a focal location outside the periodic dielectric medium. In addition, the at least one first electrode and the at least one second electrode are configured for carrying at least one electromagnetic signal developed to modify the focal location.

Another embodiment of the present invention comprises a method of modifying an electromagnetic radiation beam. The method includes providing a periodic dielectric medium exhibiting a negative refractive index at a wavelength of an incident radiation. The method also includes directing the incident radiation at an incident surface of the periodic dielectric medium. The method further includes generating a focused radiation at a focal location outside the periodic dielectric medium by a negative refraction of the incident radiation in the dielectric medium. In addition, the method includes applying at least one electromagnetic signal through at least a portion of the periodic dielectric medium and modifying the focal location in response to the at least one electromagnetic signal.

BRIEF DESCRIPTION OF THE SEVERAL VIEWS OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

FIG. 1A is a wave-vector diagram illustrating directions of wave propagation at an interface between two isotropic materials;

FIG. 1B is a wave-vector diagram illustrating directions of wave propagation at an interface between an isotropic material and a material exhibiting a negative refractive index;

FIG. 2 illustrates focusing properties of electromagnetic radiation traveling through materials exhibiting a negative refractive index;

FIG. 3A illustrates a top view of a representative periodic dielectric medium comprising a 2D photonic crystal configured with a triangular lattice;

FIG. 3B illustrates a top view of a representative, periodic dielectric medium comprising a 2D photonic crystal configured with a square lattice;

FIG. 4 is a three-dimensional view of a representative 2D photonic crystal configured with a square lattice;

DETAILED DESCRIPTION OF THE INVENTION

Figure 5:
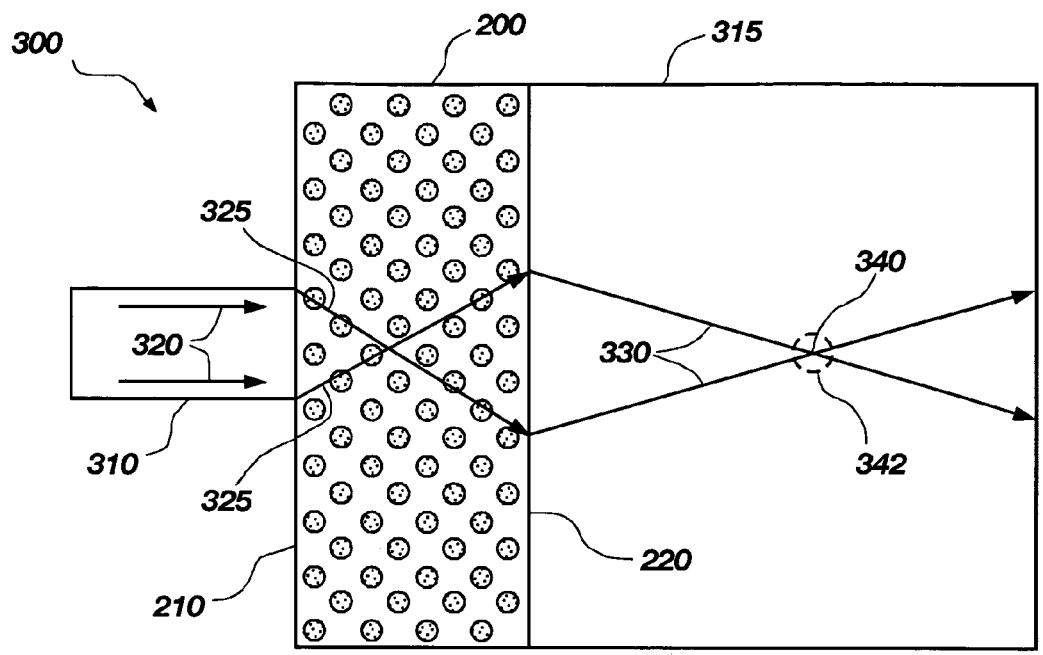
FIG. 5 is a top view of a representative electromagnetic radiation tuning device including a 2D photonic crystal configured with a triangular lattice.

In the following description, micron-scale dimensions refer roughly to dimensions that range from one micrometer up to a few micrometers, sub-micron scale dimensions refer roughly to dimensions that range from 1 micrometer down to 0.05 micrometers, and nanometer scale dimensions refer roughly to dimensions that range from 1 nanometer up to 50 nanometers (0.05 micrometers).

The present invention, in a number of embodiments, includes a tunable refractive medium and methods of modifying an electromagnetic radiation beam. Embodiments of the present invention can provide a periodic dielectric medium that includes a negative refractive index for incident radiation having a selected wavelength range. For incident radiation directed at an incident surface of the periodic dielectric medium, the negative refraction of the incident radiation that passes through the periodic dielectric medium (PDM) and to a region beyond the periodic dielectric medium may generate a focused radiation at a focal location in the region beyond the PDM. Particular embodiments may also include electrodes coupled to regions of the PDM for modifying characteristics of the PDM. Dynamically modifying the PDM characteristics may dynamically modify the focal location and focal intensity of the focused radiation 330.

With regard to refraction, Snell's law is a well known law that models refraction characteristics of a radiation beam as the radiation beam encounters an interface between two mediums with different refractive properties. Basically, Snell's law states that the product of the refractive index and the sine of the angle of incidence of a radiation beam in one medium is equal to the product of the refractive index and the sine of the angle of refraction in a successive medium.

Generally, naturally occurring materials exhibit a positive refractive index. In other words, a radiation beam with an oblique incident angle to a facet of a medium with a high positive refractive index may be deviated toward the surface normal of the facet. A radiation beam entering a medium of lower refractive index may be deviated away from the surface normal, but the deviation occurs at a positive angle relative to the surface normal. Recently, a number of man-made materials (often referred to as meta-materials) have been developed that exhibit a negative refractive index. With a negative refractive index, the material still obeys Snell's law, but the radiation beam is deviated in the opposite direction from natural materials (i.e., with a negative angle relative to the surface normal). Thus, using Snell's law, the product of the refractive index and the sine of the angle of incidence of a radiation beam in one medium is equal to the negative of the product of the refractive index and the sine of the angle of refraction in a successive medium.

The refractive properties of a positive refractive index and a negative refractive index are discussed with reference to FIGS. 1A, 1B, and 2. FIG. 1A is a wave-vector diagram illustrating directions of wave propagation through two refractive materials (110 and 120) and at the interface between the two refractive materials (110 and 120). Similarly, FIG. 1B is a wave-vector diagram illustrating directions of wave propagation at an interface between a third refractive material 130 and a negative refractive material 140.

FIG. 1A illustrates positive refraction. In FIG. 1A the upper circle illustrates an equal frequency surface EFS1 plot of a first refractive material 110. The lower circle illustrates an equal frequency surface EFS2 plot of a second refractive material 120. EFS2 is a different diameter than EFS1 due, in part, to the difference in dielectric properties between the first refractive material 110 and the second refractive material 120. Group velocity vector Vg1 is oriented perpendicular to, and away from the center of, EFS1 and illustrates the direction of wave propagation through the first refractive material 110. A first frequency line 115 illustrates a specific frequency at which group velocity vector Vg1 intersects EFS1. The first frequency line 115 is carried down to intersect with EFS2. Thus, a group velocity vector Vg2, oriented perpendicular to and away from the center of EFS2, defines the direction of wave propagation through the second refractive material 120 at the same frequency as the wave propagating through the first refractive material 110. The lower portion of FIG. 1A illustrates the two group velocity vectors Vg1 and Vg2 and the direction change that occurs at the boundary between the first refractive medium 110 and the second refractive medium 120. The direction change is due to the difference in the refractive index of the two refractive materials (110 and 120). The positive refraction can be seen by the positive angle from the surface normal for group velocity vector Vg2.

FIG. 1B illustrates negative refraction. In FIG. 1B the upper circle illustrates an equal frequency surface EFS3 plot of a third refractive material 130. The lower circle illustrates an equal frequency surface EFS4 plot of a negative refractive material 140. EFS4 is a different diameter than EFS3 due, in part, to the difference in dielectric properties between the first refractive material 110 and the negative refractive material 140. In addition, in negative refractive index material 140, as the frequency increases the equal frequency surface EFS4 moves inward around the symmetry point. Therefore, the group velocity vector Vg4 points inward indicating negative refraction. As a result, group velocity vector Vg4, illustrating the direction of wave propagation through the negative refractive material 140, is oriented perpendicular to, but toward from the center of, EFS4.

On the other hand, the third refractive material 130 is a positive refractive material similar to the first refractive material 110 and the second refractive material 120. Therefore, group velocity vector Vg3 is oriented perpendicular to and away from the center of EFS3, and illustrates the direction of wave propagation through the third refractive material 130. A second frequency line 135 illustrates a specific frequency at which group velocity vector Vg3 intersects EFS3. The second frequency line 135 is carried down to intersect with EFS4. Thus, group velocity vector Vg4 defines the direction of wave propagation through the negative refractive material 140 of a wave at the same frequency as the wave propagating through the third refractive material 130. The lower portion of FIG. 1B illustrates the two group velocity vectors Vg3 and Vg4 and the direction change that occurs at the boundary between the third refractive medium 130 and the negative refractive medium 140. The negative refraction can be seen by the negative angle from the surface normal for group velocity vector Vg4.

FIG. 2 illustrates focusing properties of electromagnetic radiation traveling through a material exhibiting a negative refractive index. In FIG. 2, a top view illustrates a slab of negative refractive material 140, with third refractive material 130 on opposite sides of the negative refractive material 140. Incident electromagnetic radiation beams have first directions 132 when they impinge on a first surface 146 of the negative refractive material 140. The negative refractive property of negative refractive material 140 cause the electromagnetic radiation beams to deviate towards second directions 142 with a negative angle from the surface normal of the first surface 146. As the electromagnetic radiation beams emit from a second surface 148 of the negative refractive material 142, they deviate towards third directions 134. As the electromagnetic radiation beams travel in the third direction 134, they converge at a focal point 136.

With conventional optical focusing devices such as lenses, a focal point is limited to near the square area of the wavelength of the electromagnetic radiation beam squared. However, with negative refraction, it has been shown that the focal point can be reduced to an area significantly smaller than the wavelength squared.

Photonic crystals have been shown to posses this negative refractive property for certain proportions of the geometry of the photonic crystal relative to the wavelength of electromagnetic radiation that will experience the negative refraction. Some example embodiments of photonic crystals are shown in FIGS. 3A, 3B, and 4.

FIG. 3A illustrates a top view of a periodic dielectric medium 200 comprising a 2D photonic crystal 200 configured with a triangular lattice (also referred to as a hexagonal lattice). The 2D photonic crystal 200 comprises a matrix 202 (also referred to as a first material). Within the matrix 202, periodically spaced columns 204 (also referred to as cylindrical regions, rods, or a second material) are disposed in an array of horizontal rows and vertical rows. As illustrated in FIG. 3A, these horizontal rows and vertical rows of rods 204 may be disposed to form a triangular lattice wherein each alternate horizontal row and vertical row is displace about half way between the adjacent horizontal row and vertical row.

FIG. 3B illustrates a top view of a periodic dielectric medium 200' comprising a 2D photonic crystal 200' configured with a square lattice, wherein the periodically spaced columns 204' in adjacent horizontal rows and vertical rows are orthogonally aligned. FIG. 4 shows a three-dimensional view of the 2D photonic crystal 200' of FIG. 3A to illustrate the lengthwise dispersion of the rods 204 through the matrix 202'.

In a 2D photonic crystal 200, the matrix 202 comprises a first material with a first dielectric constant and the rods 204 comprise a second material with a second dielectric constant. Thus, dielectric periodicity is exhibited in the photonic crystal in directions perpendicular to the longitudinal axis of the rods 204. If the difference in dielectric constant between the first material 202 and the second material 204 is large enough, a photonic bandgap (i.e., a forbidden frequency range) may occur. This photonic bandgap may create a variety of interesting properties for the photonic crystal. One of those properties is negative refraction.

By way of example and not limitation, a 2D photonic crystal 200 may comprise a matrix 202 of silicon with rods 204 of air, or a matrix 202 of air with rods 204 of silicon. In these embodiments, silicon has a dielectric constant of about 12 and air has a dielectric constant of about one. Other materials, such as, for example, InP, GaAs, and GaInAsP, have been shown to posses a photonic bandgap in combinations with each other and with air. Materials may be chosen to optimize a variety of parameters such as wavelengths where the photonic bandgap occurs, ease of manufacturing, negative refractive properties, or combinations thereof.

Referring to FIGS. 3A and 3B, the photonic crystals have a lattice constant 208 ($a$), which indicates the lateral spacing between the centers of adjacent rods 204, and the rods 204 have a substantially uniform radius 206 (r). For many purposes, it is useful to discuss a relative radius (i.e. RR=r/a) or discuss the radius 206 as a ratio of the lattice constant 208. By way of example and not limitation, a 2D photonic crystal 200 may be characterized with a lattice constant (a) and a radius proportional to the lattice constant (such as, r=0.4a, and r=0.35a).

Determining the photonic band structure of a particular photonic crystal is a complex problem that involves solving Maxwell's equations and considering the periodic variation in the dielectric constant through the photonic crystal. Thus, the photonic band structure is at least partially a function of the dielectric constant of the matrix 202, the dielectric constant of the rods 204, the radius 206 of the rods 204, and the lattice constant 208. Computational methods for computing the band structure of a particular photonic crystal are known in the art. An explanation of these computational methods may be found in John D. Joannopoulos, Robert D. Meade & Joshua N. Winn, Photonic Crystals—Molding the Flow of Light, (Princeton University Press 1995), in particular at Appendix D.

Simulations have shown that the negative refractive property of a photonic crystal will be present for a range of wavelengths ($\lambda$) within a photonic bandgap of the photonic crystal. By way of example and not limitation, Qui et al. have presented simulations of a 2D photonic crystal 200 comprising InP-InGaAsP indicating a refractive index of about −0.73 with a ratio of lattice constant 208 to frequency (i.e., a/λ) of about 0.325 (IEEE Journal of Selected Topics in Quantum Electronics, Vol. 9, No. 1, January/February 2003, pp. 106-110). In other words, using this illustrative simulation, an infrared radiation beam with a wavelength of about 1230 nm may exhibit a refractive index of about −0.73 when passing through the 2D photonic crystal 200 with a lattice constant 208 of about 400 nm.

FIG. 5 is a top view of a representative electromagnetic radiation tuning device 300 including a 2D photonic crystal 200 configured with a triangular lattice. An input waveguide 310 is configured to guide incident radiation 320, having an incident wavelength suitable for negative refraction, to an incident surface 210 of the 2D photonic crystal 200. As the incident radiation 320 passes through the 2D photonic crystal 200, it is refracted in a negative direction to become refracted radiation 325 within the 2D photonic crystal 200. As the refracted radiation 325 exits the 2D photonic crystal 200, into an exit medium 315, it is refracted in a negative direction again to become focused radiation 330.

The lines illustrating refracted radiation 325 and focused radiation 330 are used to illustrate the approximate extent and direction of the radiation beams for ideal negative refraction. Those of ordinary skill in the art will recognize that all possible angles and refractions between the lines illustrating the approximate extents are implied by the drawings illustrating radiation beam refraction.

FIG. 5 also illustrates the focal properties possible with negative refraction. As the incident radiation 320 enters the 2D photonic crystal 200, the radiation beam is focused, as refracted radiation 325, within the 2D photonic crystal 200 due to the negative refraction at the interface between the input waveguide 310 and the 2D photonic crystal 200. The radiation beam is focused once again, as the focused radiation 330, in the exit medium 315 due to the negative refraction between the 2D photonic crystal 200 and the exit medium 315. At a focal location 340, the focused radiation 330 is substantially near an optimum intensity and substantially near a minimum focal area 342. In some embodiments, this focal area 342 may be significantly smaller than the wavelength squared.

Figure 6:
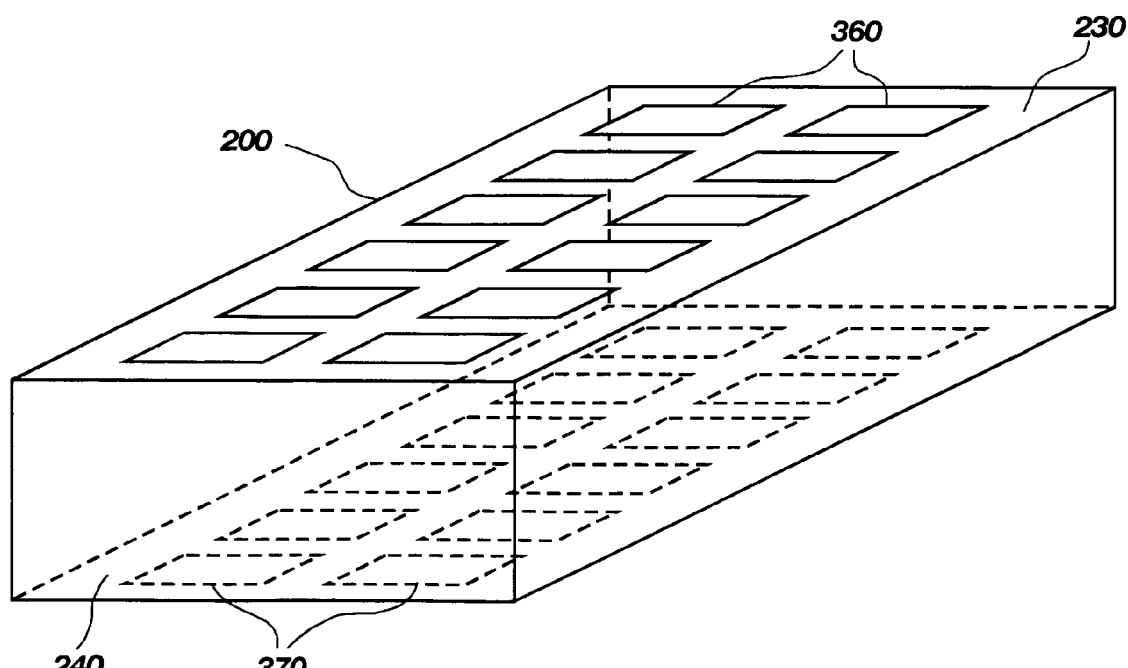
FIG. 6 is a three dimensional view of a representative electromagnetic radiation tuning device configured with electrodes on a first surface and a second surface of the periodic dielectric medium.

FIG. 6 is a three dimensional view of a representative electromagnetic radiation tuning device 300 configured with a set of first electrodes 360 on a first surface 230 and a set of second electrodes 370 on a second surface 240 of the periodic dielectric medium 200. Details of the rods 204 within the 2D photonic crystal 200 are omitted from the drawing to more clearly show the first electrodes 360 and second electrodes 370. It is noted that the descriptive terms first surface 230 and second surface 240 are used for convenience of discussion rather than referring to a specific direction or relative location. The first surface 230 and second surface 240 may be interchangeable and refer to the surfaces in planes substantially normal to the longitudinal axes of the rods 204 regardless of actual orientation of the 2D photonic crystal 200.

In addition, it will be recognized that the location and arrangement of first electrodes 360 and second electrodes 370 shown in FIG. 6 is only one representative embodiment. Many other locations, arrangements, sizes, and geometries of the first electrodes 360 and second electrodes 370 are contemplated within the scope of the invention. By way of example and not limitation, the electrodes may be round, triangular, hexagonal, or any other suitable shapes. The arrangement may comprise more or fewer rows and columns of electrodes on the first surface 230 and second surface 240. The first electrodes 360 and second electrodes 370 may be arranged in rectangular arrays, triangular arrays, hexagonal arrays, or other configurations useful for generating negative refractive properties.

Photonic crystals may be characterized by the permittivity (∈) and permeability (µ) of the medium. Permittivity is the dielectric property of the medium describing how an electromagnetic field affects, and is affected by, the medium. Permeability describes degree of magnetization of a material in response to an electromagnetic field. While the matrix 202 and the rods 204 may exhibit different permittivity and permeability, a photonic crystal may be considered as having a substantially homogenous permittivity and permeability over a general region of the photonic crystal or over the entire photonic crystal.

For most materials, both permittivity and permeability are generally not a constant. Rather, they may vary with the position in the medium, the frequency of the electromagnetic field applied, humidity, temperature, and other parameters. In addition, permittivity and permeability may affect the refraction properties of the photonic crystal by varying the angle of refraction. Furthermore, the permittivity and permeability may be varied with multiple electrodes (360 and 370) on the first surface 230 and the second surface 240 to create localized changes in the electromagnetic field of the 2D photonic crystal 200, localized electrical current through the 2D photonic crystal 200, or combination thereof. Thus, by varying the permittivity and permeability of a 2D photonic crystal 200, the refraction angles of the refracted radiation 325 and the focused radiation 330 may be altered.

Figure 7:
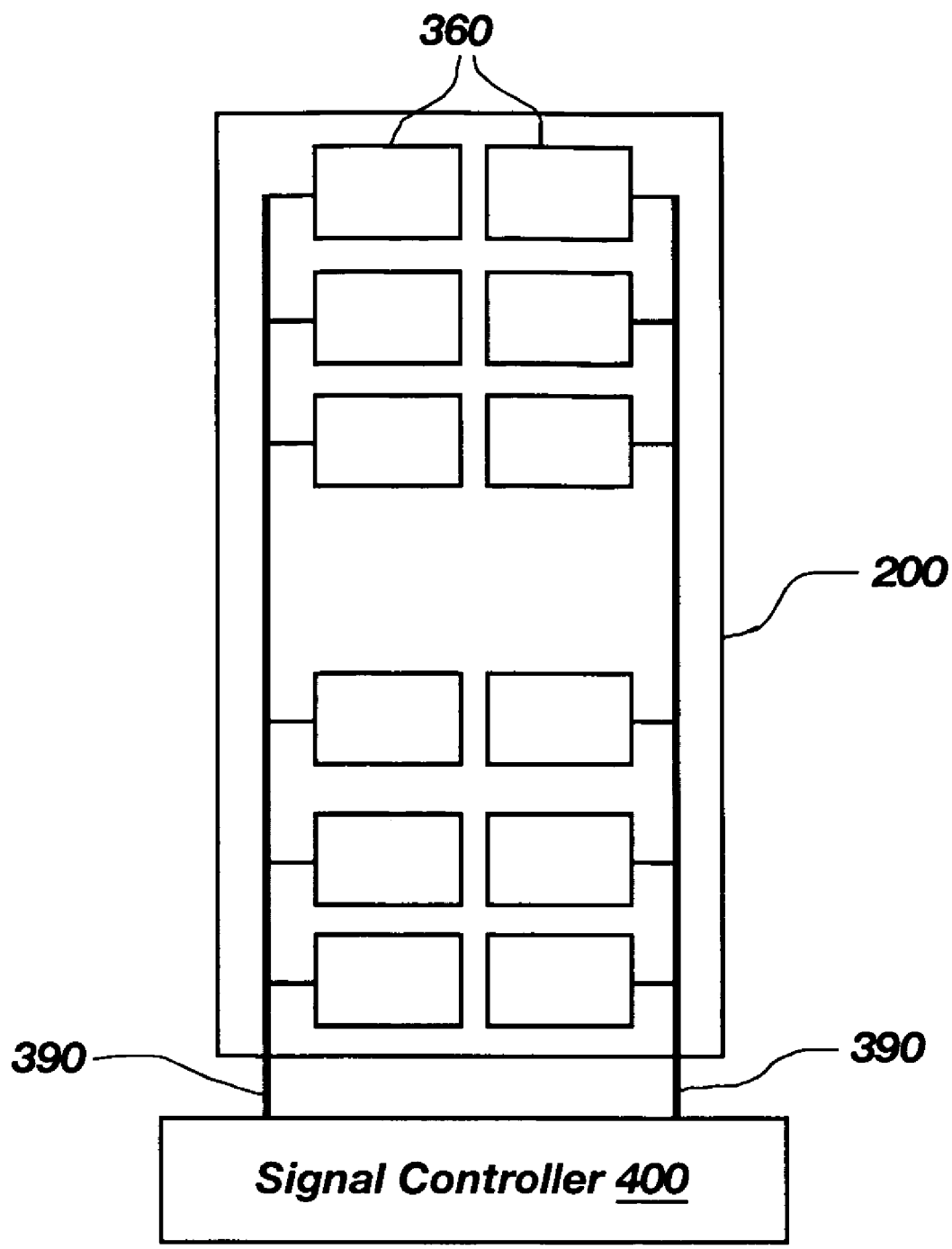
FIG. 7 is a top view of a representative electromagnetic radiation tuning device coupled to a signal controller.

FIG. 7 is a top view of an electromagnetic radiation tuning device 300 (FIG. 6) and a signal controller 400. The signal controller 400 may generate a plurality of electromagnetic signals 390 (shown as signal busses in FIG. 7) directed to a set of electrodes 360. In the embodiment of FIG. 7, the first electrodes 360 on the first surface 230 (FIG. 6) are shown, and for clarity, the second electrodes 370 on the second surface 240 (FIG. 6) are not shown. In this embodiment, the electrodes may be considered as pairs of electrodes, one for a first electrode 360 on the first surface 230, and one for a second electrode 370 on the second surface 240 and opposite the first electrode 360. Thus, a pair of electromagnetic signals 390 may be directed to each pair of electrodes to generate an electromagnetic field therebetween, an electrical current therebetween, or a combination thereof. As a result, each region of the 2D photonic crystal 200 located substantially between the electrode pair may be modified to adjust the refractive properties of the 2D photonic crystal 200 in that region. The signal controller 400 may control each pair of electrodes with a different signal to generate various electromagnetic fields at different regions of the 2D photonic crystal 200, as explained more fully below.

Figure 8:
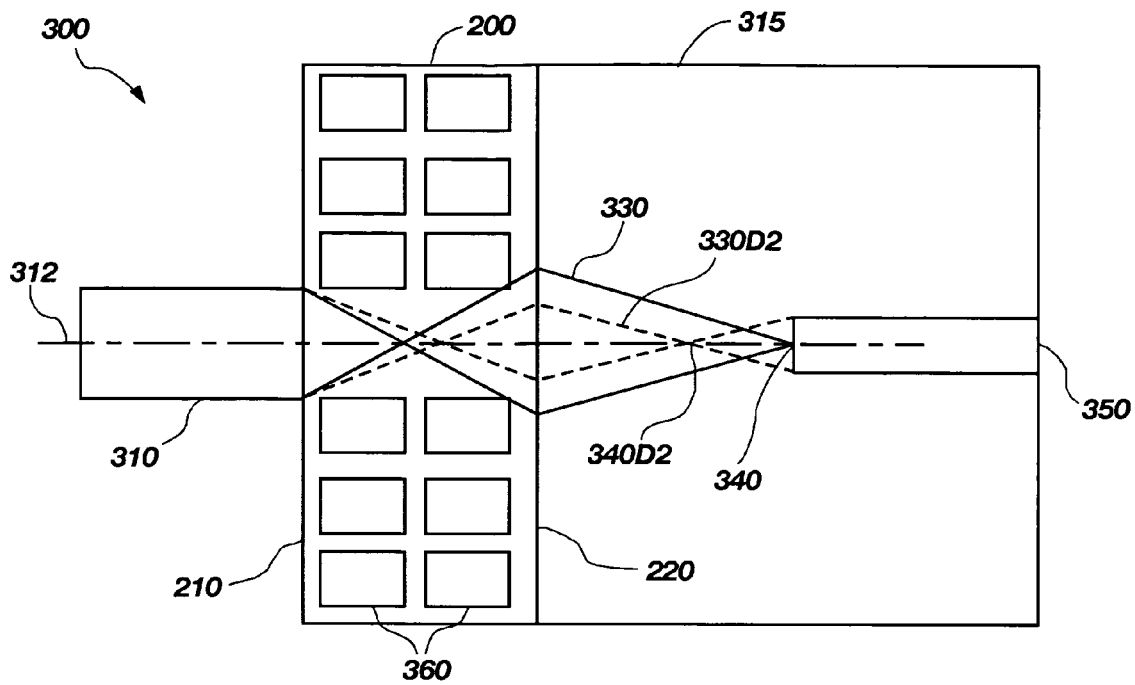
FIG. 8 is a top view of a representative electromagnetic radiation tuning device illustrating dynamic focal point tuning.

FIG. 8 is a top view of an electromagnetic radiation tuning device 300 illustrating dynamic focal point tuning. The electromagnetic radiation tuning device 300 includes an input waveguide 310, an exit medium 315, an output waveguide 350, and a periodic dielectric medium 200 configured as a 2D photonic crystal 200. For ease of description, a beam axis 312 may be defined along the longitudinal axis of the input waveguide 310 and extending through the 2D photonic crystal 200 and the exit medium 315. For clarity, the rods 204 of the 2D photonic crystal 200 and the second electrodes 370 on the second surface 240 are not shown. The exit medium 315 may be a variety of materials depending on the material used for the 2D photonic crystal 200. By way of example and not limitation, the exit material may be air, silicon, or Group III-IV materials such as, InP, GaAs, and GaInAsP.

By applying electromagnetic signals 390 (not shown in FIG. 8) between various pairs of the first electrodes 360 and the second electrodes 370, the negative refractive properties of the 2D photonic crystal 200 may be modified. In the embodiment of FIG. 7, the electric signals can be uniform across the entire crystal. Thus, the refractive index of the 2D photonic crystal 200 is modified symmetrically about the beam axis 312. However, the symmetric modification may be modified by applying a first set of electromagnetic signals 390 to the column of electrodes nearest the incident surface 210 and applying a different set of electromagnetic signals 390 to the column of electrodes near the emitting surface 220. Thus the refractive index, while being symmetric about the beam axis 312, may be modified at different points along the beam axis 312.

As a result, the focused radiation 330 beam with its focal point 340 may be modified by a focal distance along the beam axis 312 to a second focused radiation 330D2 with a second focal point 340D2. Of course, within the limits of the refractive properties of the 2D photonic crystal 200, a focal point may be dynamically adjusted to anywhere along the beam axis 312. This dynamic modification of the focal point may be used for a number of purposes. By way of example and not limitation, the focal point 340 may be modified to a position optimal for reception by the output waveguide 350. In this way, the signal controller 400 (FIG. 7) may modify the electromagnetic signals 390 (FIG. 7) to compensate for variations in the permittivity and permeability of the 2D photonic crystal 200, which may be affected by manufacturing variations, manufacturing defects, wavelength of the incident radiation 320, or environmental conditions.

Similarly, embodiments without an output waveguide 350 may be used. For example, the focused radiation 330 may be used to impinge on an analyte (not shown) located in or near the exit medium 315. Thus, the focal point 340 may be moved to focus on the analyte, or to focus on a variety of analytes distributed in or near the exit medium 315 and substantially along the beam axis 312.

As another example, the electromagnetic radiation tuning device 300 may be used as a modulator. If an output waveguide 350 is present, the focal point 340 may be moved near the output waveguide 350 or away from the output waveguide 350, thus varying the intensity of radiation received by the output waveguide 350. If an output waveguide 350 is not present, by moving the focal point 340, the intensity of the focal radiation at any given point may be modified. For example, if the focused radiation 330 is set to focus on the focal location 340, then modified to the second focused radiation 330D2 at the second focal location 340D2, the intensity of radiation at the focal location 340 is reduced, thus creating a modulation effect at the focal location 340.

Figure 9:
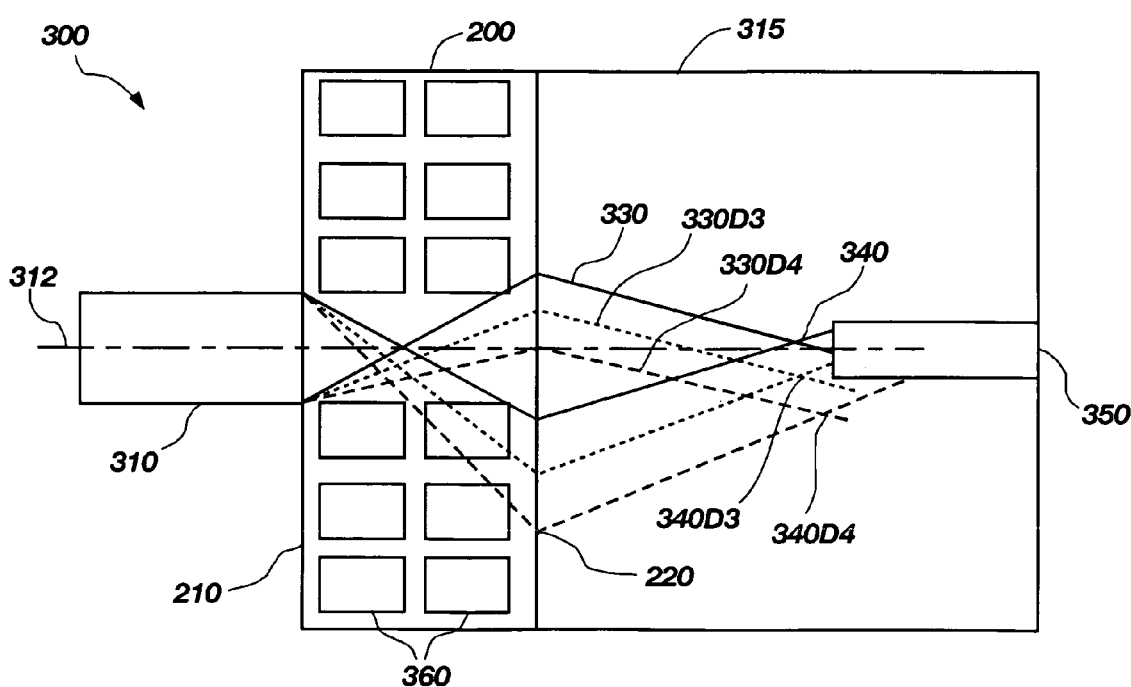
FIG. 9 is a top view of a representative electromagnetic radiation tuning device illustrating another form of dynamic focal point steering.

FIG. 9 is a top view of an electromagnetic radiation tuning device 300, illustrating another form of dynamic focal point steering. In the embodiment of FIG. 9, the electromagnetic signals 390 applied to the first electrodes 360 and second electrodes 370 may be different for the electrodes on one side of the beam axis 312 relative to the electrodes on the other side of the beam axis 312. Thus, the refractive index of the 2D photonic crystal 200 may be different on each side of the beam axis 312. Thus, the focal point 340 may be altered by modifying the focused radiation 330 beam in the exit medium 315.

As a result, the focused radiation 330 beam with its focal point 340 may be modified by a focal deflection substantially perpendicular to the beam axis 312 to a third focused radiation 330D3 with a third focal point 340D3. Also illustrated is a fourth focused radiation 330D4 with a fourth focal point 340D4. Of course, within the limits of the refractive properties of the 2D photonic crystal 200, a focal point 340 may be dynamically adjusted to any location substantially perpendicular to the beam axis 312. This dynamic modification of the focal point 340 may be used for a number of purposes. By way of example and not limitation, the focal point 340 may be modified to a position optimal for reception by the output waveguide 350. In this way, the signal controller 400 may modify the electromagnetic signals 390 to compensate for variations in the permittivity and permeability of the 2D photonic crystal 200, which can be affected by manufacturing variations, manufacturing defects, wavelength of the incident radiation 320, or environmental conditions.

Similarly, embodiments without an output waveguide 350 may be used. For example, the focused radiation 330 may be used to impinge on an analyte (not shown) located in or near the exit medium 315. Thus, the focal point 340 may be moved to focus on the analyte optimally, or focus on a variety of analytes distributed in, or near, the exit medium 315 and substantially perpendicular to the beam axis 312.

As another example, the electromagnetic radiation tuning device 300 may be used as a modulator, as explained above with reference to the embodiment of FIG. 8. However, in the embodiment of FIG. 9, the modulation occurs due to the focal point 340 being moved by a focal deflection substantially perpendicular to the beam axis 312.

It will be recognized that while not shown explicitly in a drawing, the embodiments of FIG. 8 and FIG. 9 may be combined to move the focal point 340 by both a focal distance and a focal deflection to cover a broad area of the exit medium 315, within the limits of the refractive properties of the 2D photonic crystal 200.

Figure 10:
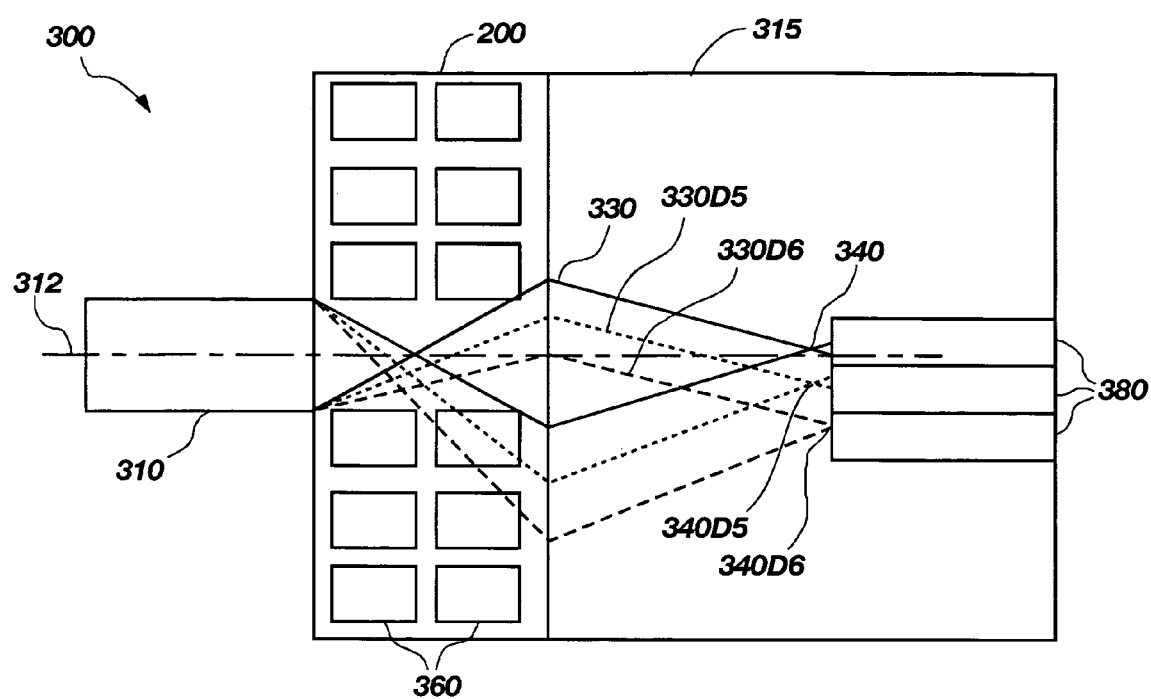
FIG. 10 is a top view of a representative electromagnetic radiation tuning device illustrating a de-multiplexing function using dynamic focal point steering.

FIG. 10 is a top view of an electromagnetic radiation tuning device 300 illustrating a de-multiplexing function using dynamic focal point steering. In the FIG. 10 embodiment, a plurality of output waveguides 380 are arranged at various locations aligned with the beam axis 312, but at different offsets relative to the beam axis 312. With this embodiment, the electromagnetic signals 390 may be modified to move the focal point 340 for optimum placement relative to one of the output waveguides 380. In the embodiment of FIG. 10, three output waveguides 380 are illustrated with the focused radiation 330 and focal point 340 aligned with the top output waveguide 380, a fifth focused radiation 330D5 with a fifth focal point 340D5 aligned with the middle waveguide 380, and a sixth focused radiation 330D6 with a sixth focal point 340D6 aligned with the bottom waveguide 380. Of course, within the limits of the refractive properties of the 2D photonic crystal 200, a focal point 340 may be dynamically adjusted to any position substantially perpendicular to the beam axis 312, with more or fewer output waveguides 380. Thus, by controlling the electromagnetic signals 390, the focused radiation 330 may be directed toward one of the waveguides forming a de-multiplexing function.

Although this invention has been described with reference to particular embodiments, the invention is not limited to these described embodiments. Rather, the invention is limited only by the appended claims, which include within their scope all equivalent devices or methods that operate according to the principles of the invention as described.

What is claimed is:

1. A tunable refractive medium, comprising:
  a periodic dielectric medium, comprising:
    an incident surface configured for receiving an incident radiation having an incident wavelength;

an emitting surface configured for emitting a focused radiation at a wavelength substantially near the incident wavelength; and a periodic structure comprising a dielectric periodicity between the incident surface and the emitting surface, the periodic structure configured for providing a negative refraction of the incident radiation and focusing the focused radiation at a focal location outside the periodic dielectric medium;

at least one first electrode operably coupled to a first surface of the periodic dielectric medium; and at least one second electrode operably coupled to a second surface of the periodic dielectric medium;

wherein the at least one first electrode and the at least one second electrode are configured for carrying at least one electromagnetic signal developed to modify the focal location.

2. The device of claim 1, wherein the focused radiation at the focal location comprises a focal area less than an area of the incident wavelength squared.

3. The device of claim 1, wherein the focal location is modified by at least one of a focal distance and a focal deflection from the incident surface.

4. The device of claim 1, wherein the periodic dielectric medium comprises a 2D photonic crystal.

5. The device of claim 4, wherein the periodic dielectric medium comprises a first material including a plurality of periodically spaced columns of a second material.

6. The device of claim 5, wherein the first material comprises a dielectric material and the second material comprises air.

7. The device of claim 5, wherein the first material comprises air and the second material comprises a dielectric material.

8. The device of claim 1, wherein the at least one electromagnetic signal is further configured to modulate an intensity of the focused radiation at a predetermined point in an exit medium.

9. The device of claim 1, further comprising a signal controller configured for controlling the at least one electromagnetic signal between the at least one first electrode and the at least one second electrode to modify a refractive property of at least a portion of the periodic dielectric medium to modify the focal location.

10. An electromagnetic radiation tuning device, comprising:

a tunable refractive medium, comprising:

a periodic dielectric medium, comprising:

an incident surface configured for receiving an incident radiation having an incident wavelength;

an emitting surface configured for emitting a focused radiation at a wavelength substantially near the incident wavelength; and a periodic structure comprising a dielectric periodicity between the incident surface and the emitting surface, the periodic structure configured for providing a negative refraction of the incident radiation and focusing the focused radiation at a focal location outside the periodic dielectric medium;

at least one first electrode operably coupled to a first surface of the periodic dielectric medium; and at least one second electrode operably coupled to a second surface of the periodic dielectric medium;

wherein the at least one first electrode and the at least one second electrode are configured for carrying at least one electromagnetic signal developed to modify the focal location;

an input waveguide configured for directing the incident radiation to the incident surface; and at least one output waveguide configured for directing the focused radiation.

11. The device of claim 10, wherein the focused radiation at the focal location comprises a focal area less than an area of the incident wavelength squared.

12. The device of claim 10, wherein the focal location is modified by at least one of a focal distance and a focal deflection from the incident surface.

13. The device of claim 10, wherein the periodic dielectric medium comprises a 2D photonic crystal.

14. The device of claim 13, wherein the periodic dielectric medium comprises a first material including a plurality of periodically spaced columns of a second material.

15. The device of claim 14, wherein the first material comprises a dielectric material and the second material comprises air.

16. The device of claim 14, wherein the first material comprises air and the second material comprises a dielectric material.

17. The device of claim 10, further comprising a signal controller configured for controlling at least one electromagnetic signal between the at least one first electrode and the at least one second electrode to modify a refractive property of at least a portion of the periodic dielectric medium to modify at least one of the focal location, the focal distance, or the focal deflection.

18. The device of claim 17, wherein modifying the focal distance modulates an intensity of the focused radiation incident on an input of the at least one output waveguide.

19. The device of claim 17, wherein modifying the focal distance modulates an intensity of the focused radiation at a predetermined location in an exit medium.

20. The device of claim 10, wherein the at least one output waveguide comprises a plurality of output waveguides and wherein modifying the focal deflection directs the focal location substantially near an input of one of the plurality of output waveguides.

21. A method of modifying an electromagnetic radiation beam, comprising:

providing a periodic dielectric medium comprising a negative refractive index at a wavelength of an incident radiation;

directing the incident radiation at an incident surface of the periodic dielectric medium;

generating a focused radiation at a focal location outside the periodic dielectric medium by a negative refraction of the incident radiation in the periodic dielectric medium;

applying at least one electromagnetic signal to at least a portion of the periodic dielectric medium; and modifying the focal location in response to the at least one electromagnetic signal.

22. The method of claim 21, wherein generating the focused radiation further comprises generating the focused radiation with an area less than an area of the incident wavelength squared.

23. The method of claim 21, wherein the focal location is modified by at least one of a focal distance and a focal deflection from the incident surface of the periodic dielectric medium.

24. The method of claim 21, wherein providing the periodic dielectric medium further comprises providing a 2D photonic crystal comprising a first material including a plurality of periodically spaced columns of a second material.

25. The method of claim 21, wherein applying at least one electromagnetic signal further comprises modifying a refractive property of at least a portion of the periodic dielectric medium to modify at least one of the focal location, the focal distance, or the focal deflection.

26. The method of claim 21, wherein applying at least one electromagnetic signal further comprises modifying a refractive property of at least a portion of the periodic dielectric medium to modify an intensity of the focused radiation at a predetermined point in an exit medium.

27. The method of claim 25, wherein modifying the focal distance modulates an intensity of the focused radiation incident on an input of at least one output waveguide.

28. The method of claim 25, wherein modifying the focal deflection directs the focal location substantially near an input of one of a plurality of output waveguides.

* * * * *